US012791858B2

(12) United States Patent
Hejda et al.

(10) Patent No.: US 12,791,858 B2
(45) Date of Patent: Nov. 10, 2026

(54) DISPLAY SCREEN, AND DISPLAY SYSTEM FOR A PANORAMIC DISPLAY UNIT

(71) Applicant: Bayerische Motoren Werke Aktiengesellschaft, Munich (DE)

(72) Inventors: Tomas Hejda, Neufahrn (DE); Jasper Stern, Munich (DE); Armin Wagner-Gentner, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 294 days.

(21) Appl. No.: 18/578,057

(22) PCT Filed: Aug. 1, 2022

(86) PCT No.: PCT/EP2022/071499

§ 371 (c)(1),
(2) Date: Jan. 10, 2024

(87) PCT Pub. No.: WO2023/030794

PCT Pub. Date: Mar. 9, 2023

(65) Prior Publication Data

US 2024/0337838 A1 Oct. 10, 2024

(30) Foreign Application Priority Data

Aug. 31, 2021 (DE) ..................... 10 2021 122 510.8

(51) Int. Cl.
*G02B 27/01* (2006.01)
*B60K 35/22* (2024.01)
(Continued)

(52) U.S. Cl.
CPC .......... *G02B 27/0149* (2013.01); *B60K 35/22* (2024.01); *B60K 35/23* (2024.01);
(Continued)

(58) Field of Classification Search
CPC ...... B60K 35/22; B60K 35/23; B60K 35/231; B60K 35/405; B60K 35/60; B60K 37/10;
(Continued)

(56) References Cited

U.S. PATENT DOCUMENTS 5,510,983 A 4/1996 Iino
5,615,023 A 3/1997 Yang
(Continued)

FOREIGN PATENT DOCUMENTS

CN 111527534 A 8/2020
CN 112513716 A 3/2021
(Continued)

OTHER PUBLICATIONS

International Search Report (PCT/ISA/210) issued in PCT Application No. PCT/EP2022/071499 dated Nov. 3, 2022 with English translation (6 pages).
(Continued)

*Primary Examiner* — Jonathan Y Jung
(74) *Attorney, Agent, or Firm* — Crowell & Moring LLP

(57) ABSTRACT

A display screen for a reflection display system in a motor vehicle has, for arrangement in front of or on a lower region of the windshield, a reflection layer, in order to reflect a display image in a display region without a double image.

7 Claims, 3 Drawing Sheets

(51) Int. Cl.

| | |
|---|---|
| ***B60K 35/23*** | (2024.01) |
| ***B60K 35/231*** | (2024.01) |
| ***B60K 35/40*** | (2024.01) |
| ***B60K 35/50*** | (2024.01) |
| ***B60K 35/60*** | (2024.01) |
| ***B60K 37/20*** | (2024.01) |
| ***G02B 27/00*** | (2006.01) |
| *B60K 35/81* | (2024.01) |

(52) U.S. Cl.
CPC .......... *B60K 35/231* (2024.01); *B60K 35/405* (2024.01); *B60K 35/50* (2024.01); *B60K 35/60* (2024.01); *B60K 37/20* (2024.01); *G02B 27/0006* (2013.01); *G02B 27/0101* (2013.01); *B60K 35/81* (2024.01); *B60K 2360/23* (2024.01); *G02B 2027/0123* (2013.01); *G02B 2027/0169* (2013.01)

(58) Field of Classification Search
CPC .. B60K 37/20; B60K 2360/816; B60K 35/81; G02B 27/0006
See application file for complete search history.

(56) References Cited

U.S. PATENT DOCUMENTS

| | | | | |
|---|---|---|---|---|
| 6,714,327 | B1 | 3/2004 | Abersfelder et al. | |
| 2002/0166273 | A1* | 11/2002 | Nakamura | B60K 35/22 40/593 |
| 2013/0242403 | A1 | 9/2013 | Hopf et al. | |
| 2017/0192233 | A1* | 7/2017 | Chen | G02B 27/0149 |
| 2018/0356634 | A1* | 12/2018 | Riebe | B60K 35/23 |
| 2019/0355923 | A1 | 11/2019 | Kishimoto | |
| 2020/0275533 | A1* | 8/2020 | Ochiai | G03B 17/55 |
| 2021/0208426 | A1* | 7/2021 | Cammenga | B60K 35/23 |
| 2021/0263311 | A1* | 8/2021 | Huber | B60K 35/22 |
| 2022/0179208 | A1 | 6/2022 | Fischer et al. | |
| 2022/0326517 | A1 | 10/2022 | Hu et al. | |
| 2022/0371440 | A1* | 11/2022 | Hasegawa | B32B 17/06 |
| 2023/0070075 | A1 | 3/2023 | Janzer | |
| 2023/0100803 | A1 | 3/2023 | Beierlein et al. | |

FOREIGN PATENT DOCUMENTS

| | | | |
|---|---|---|---|
| CN | 112540461 | A | 3/2021 |
| DE | 44 45 555 | A1 | 6/1995 |
| DE | 10 2016 124 987 | A1 | 6/2018 |
| DE | 10 2017 215 771 | A1 | 3/2019 |
| DE | 10 2020 200 561 | A1 | 7/2021 |
| DE | 10 2020 106 160 | A1 | 9/2021 |
| DE | 10 2020 107 726 | A1 | 9/2021 |
| EP | 0 891 887 | A1 | 1/1999 |
| EP | 2 616 872 | B1 | 12/2014 |
| EP | 3 076 221 | A1 | 10/2016 |
| WO | WO 2021/136687 | A1 | 7/2021 |

OTHER PUBLICATIONS

German-language Written Opinion (PCT/ISA/237) issued in PCT Application No. PCT/EP2022/071499 dated Nov. 3, 2022 with English translation (9 pages).

German Search Report issued in German Application No. 10 2021 122 510.8 dated Mar. 3, 2022, with partial English translation (11 pages).

English translation of Chinese-language Office Action issued in Chinese Application No. 202280040337.8 dated Mar. 24, 2026 (10 pages).

* cited by examiner

DISPLAY SCREEN, AND DISPLAY SYSTEM FOR A PANORAMIC DISPLAY UNIT

BACKGROUND AND SUMMARY

The invention relates to display systems in motor vehicles, in particular reflection display systems, such as panoramic head-up display systems (PHUD systems), and measures for providing a display surface suitable for a reflection display system on a windshield.

Panoramic display systems (PHUD: panoramic head-up display) generally have an active display unit arranged on an upper side of the dashboard, which outputs a luminous image. This image is reflected at a display surface provided for this purpose, in particular in a display area of a windshield, and can thus be perceived by a user in the vehicle.

The display image is generally displayed over a large part of the width of the windshield, but only in a lower area of the windshield, which is accordingly formed as a black print area for better perceptibility of the display image.

To optimize the reflection of the display image on the inner surface of the windshield, the properties of the inner surface of the windshield are to be changed in the display area.

Properties of the windshield are generally specified comprehensively for the entire windshield in the production process for windshields for vehicles. The optical properties can thus be modified and adapted by special coatings or use of suitable films in the overall layer composite of the windshield, such as an improvement of the reflection properties for light of specific polarization directions.

In the production process of windshields for vehicles, in general the optical properties thereof are usually defined over the entire area of the windshield for economic reasons or for reasons of production complexity, so that the optical properties and the structure of the overall layer composite of the windshield are generally homogeneous over the surface. Partial openings or areas having changed optical behaviors generally have to be implemented later, which requires additional effort in the production process.

The document DE 10 2020 106 160 A1 discloses a windshield display system for a motor vehicle having a head-up display device, wherein the head-up display device has a projection device for emitting a projection light beam bundle having first image information in the direction of a first display area of a windshield, so that this is reflected there and is perceptible in an ocular area, and a transparent cover for protecting the projection device, wherein the cover has a cover pane and a first polarization filter, wherein the first polarization filter transmits light of a first polarization direction and completely reflects light of a second polarization direction.

The document DE 10 2020 107 726 A1 discloses a windshield for a vehicle having a circumferential edge area, which contains a black print, wherein the windshield has at least one separate dark display area, which is separate from the black print in the edge area, wherein the display area is a film laminated into the windshield.

The document EP 3 076 221 A1 discloses an optical combiner for a head-up display module for a vehicle having a windshield. A transparent plate is provided in order to reflect a projected image onto a previously established predefined area. The transparent plate is installed on a surface of the windshield which faces toward the predetermined area, so that the windshield offers mechanical support for the transparent plate.

The document EP 2 616 872 B1 discloses a head-up display having a projection screen and a device for moving and positioning the projection screen, in order to retract or extend the projection screen. The projection screen is made transparent.

The document DE 10 2020 200 561 A1 discloses a composite pane for a motor vehicle, in particular a windshield for a head-up display, having a transparent carrier pane and having a heating layer, which is arranged in or on the carrier pane and is made translucent, wherein the heating layer has carbon fibers which can be electrically energized to generate thermal energy in the heating layer.

It is the object of the present invention to provide an improved display screen for a reflection display system, on which a display image of a PHUD display device can be perceived in an optimal manner and which entails only minor additional expenditure in the production.

According to the invention, a display screen for a reflection display system and a reflection display system are provided.

According to a first aspect, a display screen is provided for a reflection display system in a motor vehicle, wherein the display system has a reflection layer to be arranged in front of or at a lower area of the windshield, in order to reflect a display image in a display area, in particular in a manner free of double images.

In particular, the display image is only to be efficiently reflected on the side of the display screen inclined toward the driver, so that a reflection essentially free of double images results.

The display screen can be produced in a 2D lamination process, in which multiple thin layers having different properties may be layered with little effort. The light refraction in such a thin optical system is negligible, so that essentially no double image arises. If a display surface of a reflection display system is provided on a windshield, it is only possible to achieve freedom from double images with a high level of effort, since the pane thickness of the windshield plays a role in the occurrence of double images.

According to embodiments of the invention, a display screen is provided which is attachable as an additional component to or in front of the windshield and which has optical properties in order to provide a display image, which is provided by a display unit of a reflection display system, on a display area in a manner which is optimal for the user. The display screen can be a single-layer or multilayer planer element, which is preferably attached on the inside in front of a lower area of the windshield or is arranged on the inside of the windshield at a lower area. The display screen has a suitable reflection layer for this purpose, which enables the perception of the display image by reflection.

The dimensions of the display screen are directed to the display image to be displayed according to the size of the display area for the reflection display system. In this way, it is possible to use a conventional windshield of a vehicle for a reflection display system, without design changes or optical adaptations or reworking of the windshield being necessary. The display screen is applied in a suitable manner in front of the windshield or thereto and provides all optical and other properties required for the display area of the reflection display system.

To arrange the display screen in front of the inside of the windshield, the display screen can be formed having an adhesive surface on the side opposite to a reflection surface, in order to insert the display screen, after the installation of the windshield in the vehicle, in the relevant display area and adhesively bond it to the windshield over part or all of its surface.

Alternatively, the windshield and the display screen can be provided with interacting holding devices, in order to attach the display screen later, in particular after the installation of the windshield, in front of an inside of the windshield by clipping on, pinning on, or other mechanical connection techniques.

The display screen is preferably arranged entirely or partially in front of an opaque lower area of the windshield, i.e., a so-called black print area, so that the display screen mounted in front is not perceptible from the outside through the windshield. This also makes it possible to prevent any fastening and holding devices which hold the display screen in position from being viewed from the outside.

The display screen can have a black layer to form an opaque display area.

The display screen can be a layer composite made up of multiple layers which, in addition to the reflection layer, also comprises a black layer to form a black print area, in order to prevent a view into any intermediate space between the black print area of the windshield and the display screen arranged in front of it in the optical arrangement direction toward the driver or user.

Due to the separate design of the display screen, it is not affected by any possible replacement of the windshield and can be reused by detaching the connection to the windshield and re-fastening.

A holding device, which is detachable in particular, can be provided in order to fasten the display screen to the windshield.

In particular, the display screen can have openings for receiving holding pins, which represent part of the holding device.

A heating layer can be provided in order to heat the display screen to remove condensation or frost. The heating device can be provided between the black print layer of the display screen and the surface of the display screen facing toward the windshield, in order to heat the display screen separately from the windshield. This enables condensation or possibly a frost layer to be removed quickly since the thermal mass of the display screen is generally significantly less than the thermal mass of the windshield.

The heating layer of the display screen can also be used, due to the arrangement in front of the windshield, for heating the corresponding lower area of the windshield, in front of which the display screen is arranged, in particular the area in which the wiper blades of the windshield wiper system rest on the outside. These can thus be detached more quickly from the windshield in the event of frost.

Furthermore, the display screen can extend over more than half the width of the windshield in order to enable a panoramic display.

According to a further aspect, a reflection display system for a motor vehicle is provided, comprising the above display screen, a windshield, and a display unit for displaying a display image, wherein the display screen and the display unit are arranged so that a display image is perceptible in an ocular area of a user, wherein the display screen is arranged on or in front of a lower area of the windshield.

Furthermore, the lower area of the windshield can be formed as a black print area or can correspond thereto, wherein the display screen is designed so that it entirely or partially covers the black print area with respect to the surface direction, or wherein the display screen is designed so that its upper edge terminates flush with the black print area with respect to a horizontal direction or lies below it.

Embodiments will be explained in more detail hereinafter on the basis of the appended drawings.

DETAILED DESCRIPTION OF THE DRAWINGS

Figure 1A:
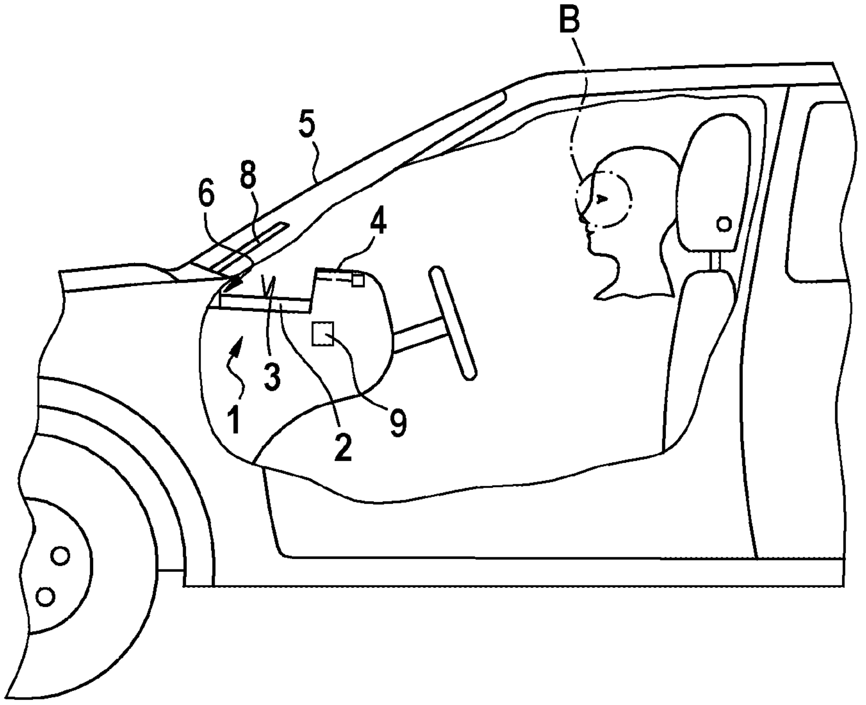
FIGS. 1*a* and 1*b* show a schematic cross-sectional representation through a reflection display system in a motor vehicle or an interior view of a reflection display system.
Figure 1B:
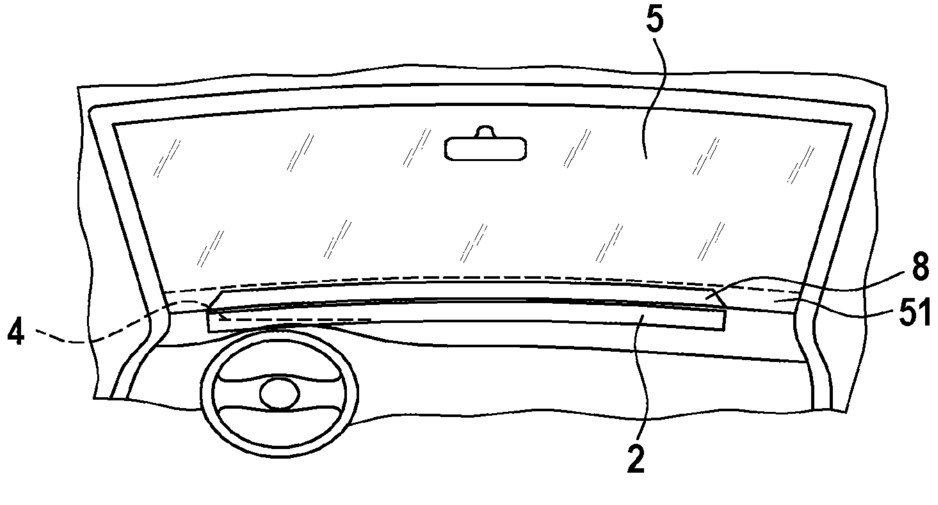

FIGS. 1*a* and 1*b* show a schematic cross-sectional representation through a motor vehicle having a reflection display system 1 and a representation from the viewing angle of the driver of the motor vehicle. The reflection display system 1 is arranged on an upper side of a dashboard 4 and has a display unit 2, which comprises a display surface 3 for displaying a display image. The display unit 2 is arranged on the upper side of the dashboard 4 below a windshield 5.

A display screen 8 is arranged in front of the windshield 5, and extends over a large part of the windshield 5 in front of a lower area adjoining a lower edge of the windshield 5 and provides a planar display area, which is used to reflect the display image displayed via the display surface 3. The display screen 8 can be applied directly to the windshield 5, or can be arranged in front of its inside at a distance of between 0 and 10 cm.

The display screen 8 extends over a height of the windshield 5 which comprises the display area. The display screen 8 can be implemented as a 0.5-1 mm thin film-like element, for example, made of a plastic material, and also as a structure up to 100 mm thick, which can press against the windshield and which can be formed having a supporting auxiliary structure. In this case, it is also possible to achieve a curve of the display screen independent of a windshield curvature. The properties of the overall display system may be optimized by such a curvature of the display screen independent of the windshield.

A curve of the display screen independent of the windshield curvature can be advisable in the case of extreme pane geometries of the windshield if acceptable display quality is not achievable due to the extreme pane geometries (for example, MINI vehicles). In order to avoid this problem, for an optimum display, a display screen having a reflection surface is required which has a more favorable (lesser) curvature. Due to the difference between the curvatures of the windshield and the display screen, a crescent-shaped space arises, which can be filled using an auxiliary structure. This structure can be implemented as discreetly as possible for the occupants, so that only the reflection surface is perceptible. Since the reflection surface has a similar color and similar reflection properties as the black print area of the windshield in the background, the display screen is to appear as part of the black print. The curve of the display screen is to enable more harmonic integration into the vehicle than a planar surface.

The display screen 8 is made reflective, i.e., having a reflection surface, at least on a side facing away from the windshield 5, in order to be able to perceive a display image displayed on the display surface 3 via the reflection surface as much as possible without losses of luminous intensity and without perceptible double image.

The display surface 3 is oriented with respect to the display area of the windshield 5 so that a display image displayed on the display surface 3 of the display unit 2 is reflected at the reflection surface of the display screen 8 and can be perceived by a vehicle occupant in an ocular area B. The orientation of the display unit 2 or its display surface 3 is thus preferably essentially parallel to the vehicle longitudinal and transverse axes or deviates therefrom by an angle of not more than 0-30°.

The display unit 2 is activated by a control unit 9 in order to output a desired display image to be perceived by the vehicle occupant.

The display unit 2 is attached in a depression 6 of the dashboard, so that a direct view of the display surface 3 of the display unit 2 is not possible by the vehicle occupant and blinding of the vehicle occupant by direct light from the display surface 3 in the ocular area B is avoided. Furthermore, the display surface 3 of the display unit 2 is oriented so that a displayed display image is reflected on the reflection side of the display screen 5 and can be perceived by a vehicle occupant in an ocular area B as a reflection image R on the display screen 8.

The display unit 2 is preferably designed as a light-emitting display unit, in particular as an LCD display unit having a backlight of high brightness or as a micro-LED display unit, in order to provide a bright display image, so that the generated reflection image can be perceived via the corresponding area of the windshield 5 even in the event of high ambient brightness.

The display screen 8 can be arranged over a large part of the width of the windshield 5 directly on a lower area of the windshield 5. This lower area of the windshield 5 generally has a black print area 51 and is thus opaque. The black print area generally has a height from the lower edge of the windshield 5 between 5 and 30 cm.

In particular, the upper side of the display screen 8 can terminate essentially with the upper side of the black print area of the windshield 5 or can lie below it in the vertical direction. In particular, the display screen 8 can be curved with its upper and lower edge in order to accordingly emulate a curvature of the windshield 5 in the width direction of the vehicle.

Figure 2:
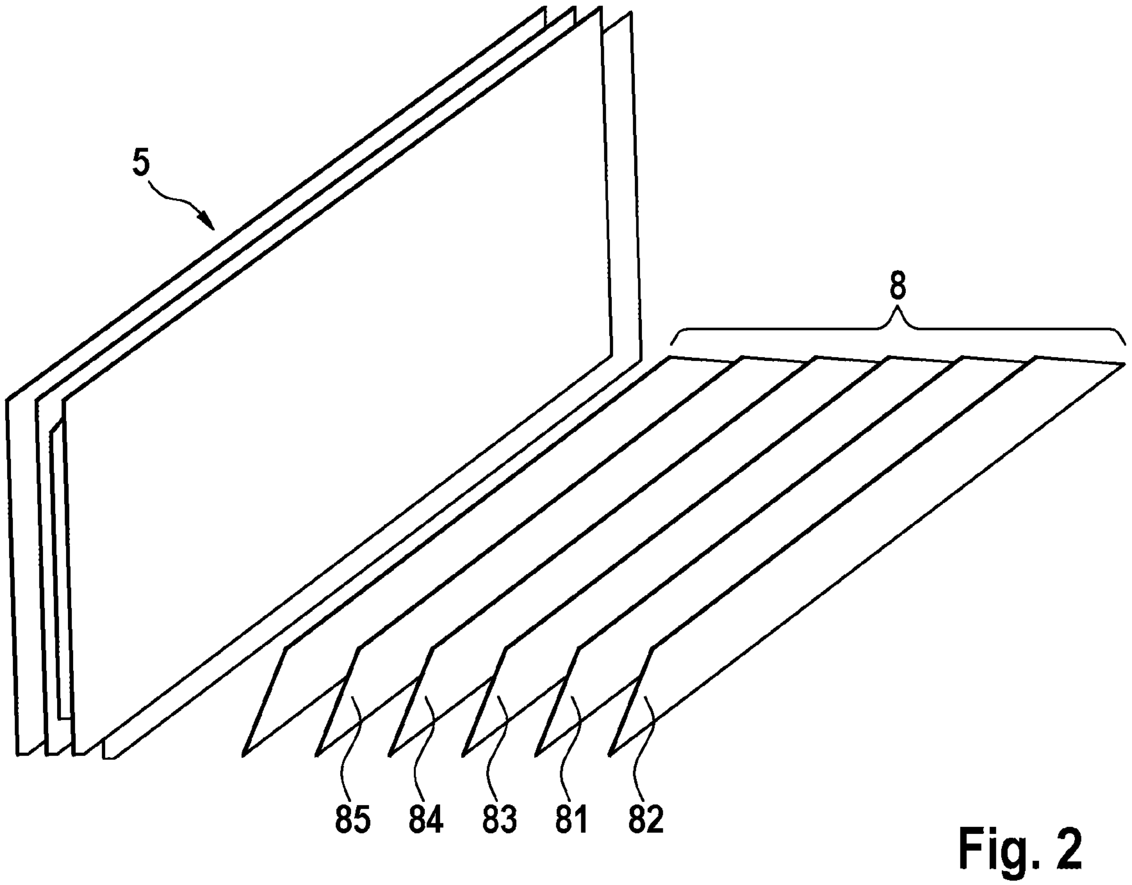
FIG. 2 shows a representation of the layer structure of the display screen.

FIG. 2 shows a layer structure of the display screen 8. A reflection layer 81 can be seen, which has the reflection properties required for the reflection display system. In particular, the reflection layer 81 has a preferred reflection of the display light of the display unit 2 in a specific polarization direction. The reflection layer 81 can be provided with a protective layer 82 on the side facing toward the PHUD display unit 2, in order to protect the reflection layer 81 from damage or soiling.

In the direction of the windshield 5, i.e., the side opposite to the protective layer 82, a black layer 83 can flatly adjoin the reflection layer 81, which is opaque or has a very high tint; the light incident from the direction of the windshield 5 is darkened below the perceptibility threshold of a user. A heating layer 84 can flatly adjoin the black layer 83, and enables the entire display screen 8 to be heated, in order to free it from condensation or a frost layer if necessary.

A further protective layer 85 can terminate the display screen 8 on a side facing toward the windshield 5.

The display screen 8 can be applied with the aid of an adhesive layer 85 to the windshield 5 extensively or only in a lower area of the display screen 8.

The display screen 8 can furthermore have a supporting plastic layer. Alternatively, the display screen can consist of one or more mineral glass-based layers. A combination of mineral glass and plastic layers is also possible. To achieve the required properties of the display screen, one or more layers can be provided with a functional coating.

Figure 3:
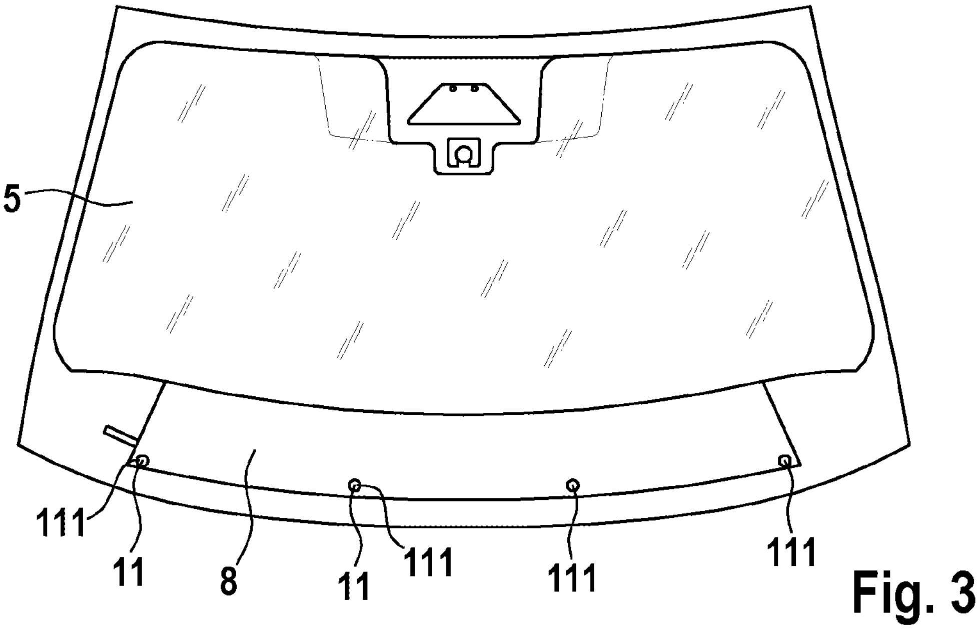
FIG. 3 shows a schematic representation of the fastening of the display screen using a holding device on the windshield.

FIG. 3 shows a top view of the windshield 5 having a display screen 8 attached in front of it. Alternatively or additionally to the adhesive layer 85, holding elements 11 in the form of protruding holding pins 11 can be applied to the windshield 5 to hold the display screen 8, which are inserted into the display screen 8 through corresponding openings 111 for the installation, so that the display screen 8 is held fixed in position with respect to the windshield 5. The holding pins 11 can be provided with corresponding detent elements or can be provided for receiving head elements, which can be plugged onto the holding pins 11 and can lock with the holding pins 11. The holding pins 11 can preferably be arranged here at a lower edge of the windshield 5 so that they cannot be perceived by a driver or other vehicle occupants in the display area.

Figure 4A:
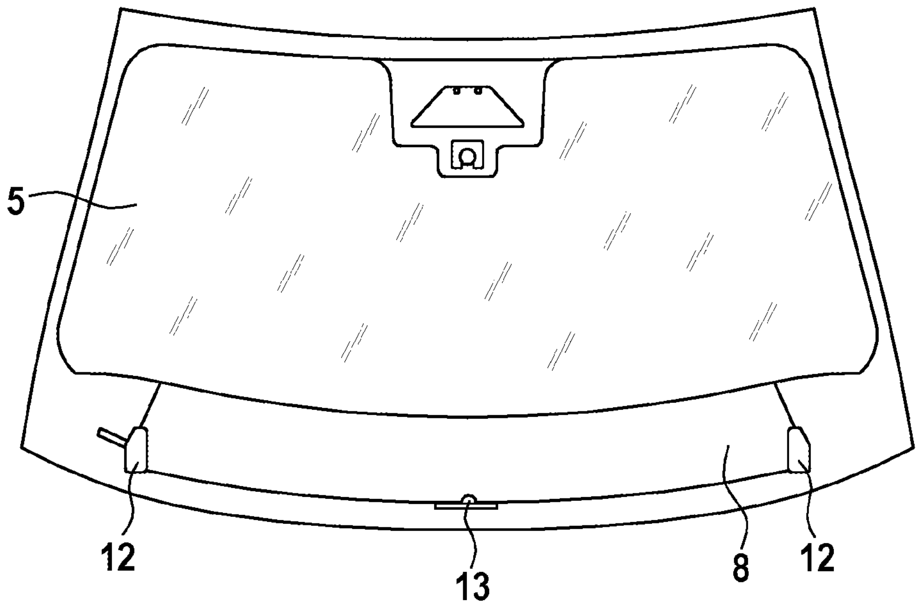
FIGS. 4*a* and 4*b* show a top view of the windshield having a display screen attached in front of it and holding elements, which hold the display screen with surface tension and the windshield, as well as a more detailed representation of the holding element.

FIG. 4*a* shows a top view of a windshield 5 having a film-like display screen 8 attached in front of it. The fastening of the display screen 8 takes place with pre-tension in the transverse direction of the vehicle, wherein holding elements 12 arranged horizontally offset are applied to the windshield, for example, by adhesive bonding with a vertical guide 121 in particular so that the film-like display screen 8 can be inserted into the holding elements by pushing in in the vertical direction. The display screen 8 is provided between the holding elements 12 with a surface tension in the horizontal direction here, so that this screen is curved in the direction of the curved windshield 5 and thus adapts to the shape of the windshield 5 or provides a curvature separate therefrom.

If the surface tension is sufficiently large, the display screen 8 presses flatly against the windshield 5 and the display screen 8 automatically assumes the shape specified by the inside of the windshield 5. The originally two-dimensional display screen 8 is thus-presuming sufficient elasticity-curved three-dimensionally in accordance with the windshield.

To prevent relaxation of the display screen in the vertical direction, a stop element 13 can be provided approximately in the center of the windshield 5 to support the lower edge of the display screen 8, on which the display screen 8 presses or supports itself downward.

Figure 4B:
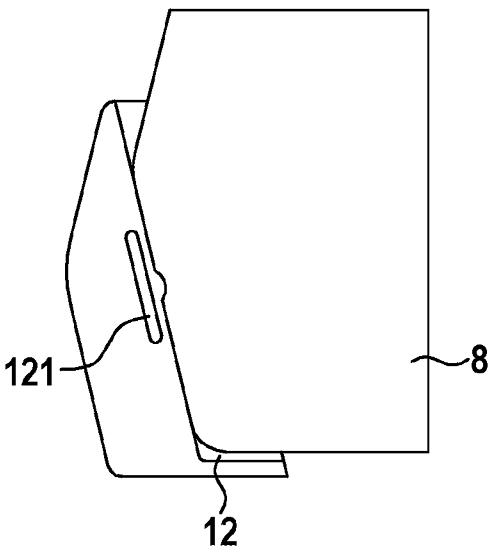

FIG. 4*b* shows the holding element 12 in detail. The guide 121 formed by a lug for receiving a lateral edge of the display screen 8 can be seen.

LIST OF REFERENCE SIGNS

1 reflection display system
2 display unit
3 display surface
4 dashboard
5 windshield
51 black print area
6 depression

8 display screen
81 reflection layer
82 protective layer
83 black layer
84 heating layer
85 further protective layer
9 control unit
11 holding pin
111 openings
12 holding element
121 vertical guide
B ocular area

What is claimed is:

1. A reflection display system for a motor vehicle, the reflection display system comprising:

a windshield;

a display screen comprising a reflection layer to be arranged in front of or on a lower area of the windshield in order to reflect a display image in a display area; and a display unit for displaying a display image, wherein:

the display screen is formed separately from the windshield, the display screen and the display unit are arranged so that a display image is perceptible in an ocular area of a user, the display screen is arranged on or in front of the lower area of the windshield, the display screen is held in guides by holding elements fastened on the windshield, and the guides are arranged so that upon receiving the holding elements, the guides hold the display screen under surface tension so that the display screen is curved in a direction of the windshield.

2. The reflection display system according to claim 1, wherein:

a heating layer is provided in order to heat the display screen to remove condensation or frost from the display screen, and the heating layer is arranged parallel to the reflection layer.

3. The reflection display system according to claim 1, wherein the display screen extends over more than half of a width of the windshield in order to enable a panoramic display.

4. The reflection display system according to claim 1, wherein the display screen has a height of between 5 and 30 cm.

5. The reflection display system according to claim 1, wherein at least one of an upper edge or a lower edge of the display screen is curved.

6. The reflection display system according to claim 1, wherein:

the lower area of the windshield is formed as a black print area or corresponds to the black print area, and the display screen is configured so that an upper edge of the display screen terminates flush with the black print area with respect to a horizontal direction or lies below the black print area.

7. A reflection display system for a motor vehicle, the reflection display system comprising:

a windshield;

a display screen comprising a reflection layer to be arranged in front of or on a lower area of the windshield in order to reflect a display image in a display area; and a display unit for displaying a display image, wherein:

the display screen is formed separately from the windshield, the display screen and the display unit are arranged so that a display image is perceptible in an ocular area of a user, the display screen is arranged on or in front of the lower area of the windshield, the display screen is held in guides by holding elements fastened on the windshield, and the guides are arranged so that upon receiving the holding elements, the guides hold the display screen under surface tension so that the display screen is curved in a direction of the windshield and is pressed against or presses on the windshield.

* * * * *